Patented Nov. 24, 1953

2,660,608

UNITED STATES PATENT OFFICE 2,660,608

BRANCHED CHAIN OCTADECENONE AND PREPARATION THEREOF

Walter Kimel, Highland Park, N. J., assignor to Hoffmann-La Roche Inc., Nutley, N. J., a corporation of New Jersey No Drawing. Original application July 18, 1952, Serial No. 299,739, now Patent No. 2,628,251, dated February 10, 1953. Divided and this application July 23, 1952, Serial No. 300,501

2 Claims. (Cl. 260—595)

This invention relates to a novel chemical compound and to a process of preparing and converting said compound. More particularly, the invention discloses a new substance, 3,7,11-trimethyl-1-dodecen-3-yl 3-oxobutanoate, which can be represented by the formula:

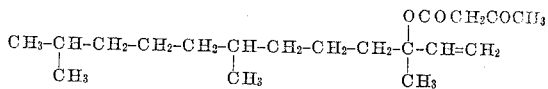

This substance can be prepared by condensing diketene with 3,7,11-trimethyl-1-dodecen-3-ol, and the product can be converted by heating (with loss of carbon dioxide) into 6,10,14-trimethyl-5-pentadecen-2-one. The latter can be converted into hexahydrofarnesylacetone by known processes, and thus the invention is of interest to the pharmaceutical and perfume industries.

The alcohol starting material can exist in optically active and racemic forms, and the invention is applicable to all of such forms. Accordingly, the invention comprehends also the racemic and optically active forms of the novel condensation product disclosed herein. The invention comprehends also any stereoisomeric form of the trimethyl-pentadecenone final product which can be made from the novel condensation product.

The invention is further disclosed in the following example, which is illustrative but not limitative thereof.

Example

In a flask equipped with mechanical stirrer, dropping funnel, thermometer and drying tube, 0.01 mol of sodium (0.23 g.) or, alternatively, of sodium methoxide (0.54 g.) was dissolved in one mol of racemic 3,7,11-trimethyl-1-dodecen-3-ol (226 g.). The solution was cooled to $+10°$ C. and 1.2 mols of diketene (101 g.) was added, dropwise, from the dropping funnel, over a period of 5 hours. The temperature was maintained at $+10°$ C. during this period. Stirring was continued for an additional 24 hours at 15 to 20° C. Then, the reaction mixture was extracted several times with saturated sodium bicarbonate solution to remove acidic byproducts, and finally washed with water to neutrality. The solvent was removed by distillation in vacuo, leaving 3,7,11-trimethyl-1-dodecen-3-yl 3-oxobutanoate, which may be used for the next step without further purification.

1 mol (310 g.) of the crude ester prepared above was placed in a flask equipped with an efficient stirrer, thermometer and reflux condenser and connected through the latter to a gas meter. The flask was heated by a hot oil bath. Decarboxylation started at about 140° C., and was very vigorous at 170° C. Heating was continued at that temperature until the evolution of carbon dioxide had ceased (about 75 minutes). Then, the residue was purified by distillation in vacuo. The product, 6,10,14-trimethyl-5-pentadecen-2-one, had B. P. 120°–125° C. (0.5 mm.); $n_D^{25}$ 1.4542.

This application is a division of my copending application Serial No. 299,739, filed July 18, 1952, now U. S. Patent No. 2,628,251.

I claim:

1. A process which comprises condensing diketene with 3,7,11-trimethyl-1-dodecen-3-ol and decarboxylating the condensation product to produce 6,10,14-trimethyl-5-pentadecen-2-one.

2. A process of preparing 6,10,14-trimethyl-5-pentadecen-2-one which comprises heating 3,7,11-trimethyl-1-dodecen-3-yl 3-oxobutanoate to eliminate carbon dioxide therefrom.

WALTER KIMEL.

References Cited in the file of this patent

FOREIGN PATENTS

| Number | Country | Date |
|--------|---------|------|
| 646,962 | Great Britain | Nov. 29, 1950 |